April 14, 1964     J. R. SIBLEY     3,128,998
SCROLL TYPE FULL FACE CONTINUOUS MINER
Filed June 2, 1958     9 Sheets-Sheet 1

*INVENTOR:*
JOHN R. SIBLEY
BY Charles F. Osgood
ATTORNEY

April 14, 1964

J. R. SIBLEY 3,128,998

SCROLL TYPE FULL FACE CONTINUOUS MINER

Filed June 2, 1958

INVENTOR.
JOHN R. SIBLEY

BY Charles F. Osgood,

ATTORNEY

April 14, 1964  J. R. SIBLEY  3,128,998
SCROLL TYPE FULL FACE CONTINUOUS MINER
Filed June 2, 1958  9 Sheets-Sheet 7

INVENTOR:
JOHN R. SIBLEY
BY Charles F. Osgood
ATTORNEY

April 14, 1964     J. R. SIBLEY     3,128,998
SCROLL TYPE FULL FACE CONTINUOUS MINER Filed June 2, 1958     9 Sheets-Sheet 9

*INVENTOR:*
JOHN R. SIBLEY

BY Charles F. Osgood

ATTORNEY

United States Patent Office 3,128,998
Patented Apr. 14, 1964

3,128,998
SCROLL TYPE FULL FACE CONTINUOUS MINER
John R. Sibley, Franklin, Pa., assignor to Joy Manufacturing Company, Pittsburgh, Pa., a corporation of Pennsylvania
Filed June 2, 1958, Ser. No. 739,053
15 Claims. (Cl. 262—9)

This invention relates to mining machines and more particularly to a full face continuous miner for dislodging mineral from a solid mine vein without the use of explosives.

Continuous miners of certain known types embody swinging disintegrating devices which must be swung relative to the face of a mine vein to effect the dislodging and disintegrating operation. Other types of miners have disintegrating devices of a fixed width, with some height adjustment and in all such types of miners considerable time is consumed in swinging or adjusting the disintegrating devices with respect to the work. In my copending application Serial No. 698,498, filed November 25, 1957, owned by the same assignee as the present invention, now Patent No. 3,061,290, there is disclosed a full face continuous miner having disintegrating devices adjustable both in width and height and the present invention contemplates improvements over such known types of miners and that of my copending application.

The continuous miner of the present invention involves a pair of cooperating elongated horizontal disintegrating rotors or drums having both disintegrating and conveying functions and mounted on a mobile base to swing through a relatively wide range relative thereto both in horizontal and vertical planes so as to accommodate the machine to varying mining conditions. The disintegrating drums or rotors of the present invention are disposed in forwardly extending diverging relationship at a fixed angle during their operation and means is provided for automatically oscillating the drums or rotors in upright planes a distance substantially corresponding to the height of the mine vein between the floor and roof of the mine, and the range of oscillation may be varied to suit different vein heights.

An object of the present invention is to provide an improved mining machine whereby mineral may be dislodged from a mine vein rapidly and efficiently without the use of explosives. Another object is to provide an improved disintegrating head mechanism for a continuous miner. A further object is to provide an improved full face type disintegrating head mechanism which is adjustable in operating range both in horizontal and vertical planes to suit varying mining conditions. Yet another object is to provide an improved disintegrating head mechanism of the full face type comprising horizontal disintegrating and conveying drums or rotors mounted to swing horizontally for disintegrating the mineral of a mine vein and for conveying the disintegrated mineral rearwardly and inwardly toward the machine conveying means. A still further object is to provide improved horizontally swingable disintegrating and conveying rotors which may also swing in vertical planes to dislodge the mineral between the mine floor and roof. Another object is to provide a disintegrating and conveying rotor comprising a spiral vane type conveyor carrying disintegrating teeth on its vane-peripheries. Still another object is to provide an improved mechanism for oscillating said disintegrating rotors in vertical planes during the mining operation while said rotors are normally maintained in relatively fixed forwardly and outwardly diverging relation. Yet another object is to provide a supporting structure having improved bearing means for a disintegrating rotor and improved rotor driving means. A still further object is to provide an improved disintegrating mechanism for forming an opening of generally rectangular cross section in a mine vein. Another object is to provide an improved diverging disintegrating rotor arrangement for forming a generally V-shaped face and having improved cutter means acting at the apex or cusplike portion of the V at the roof level for detaching the mineral from the roof as mining progresses. A further object is to provide an improved cutter arrangement whereby an improved cutting action is obtained. These and other objects and advantages of the invention will, however, hereinafter more fully appear.

In the accompanying drawings there are shown for purposes of illustration one form and several modifications which the invention may assume in practice.

In these drawings.

The improved full face continuous mining machine, as shown in the drawings, is of a low compact design and generally comprises a mobile base 1, herein desirably a crawler base, carrying a horizontal support or frame 2 arranged in a relatively low horizontal position down between the crawler treads, and mounted on the forward portion of this frame is a pair of cooperating horizontal disintegrating and conveying rotors or drums 3. These rotors consist of spiral auger cutters or spiral conveyors having peripheral cutters 4 arranged along the external peripheries of the spiral rotor vanes 5, as will later be referred to. These disintegrating rotors are mounted on the base frame to swing both in horizontal and vertical planes relative thereto and mechanism, generally designated 6, is provided for continuously oscillating the rotors in vertical planes between the mine floor and roof to dislodge the mineral from the working face. The range of horizontal swing and vertical oscillation of the disintegrating rotors may be varied to suit varying mining conditions. Extending centrally lengthwise of the base frame is a conventional endless chain-flight conveying means 7 for receiving the dislodged and disintegrated mineral and for conveying the same rearwardly longitudinally of the machine to discharge at the rear end of the machine.

Figure 1:
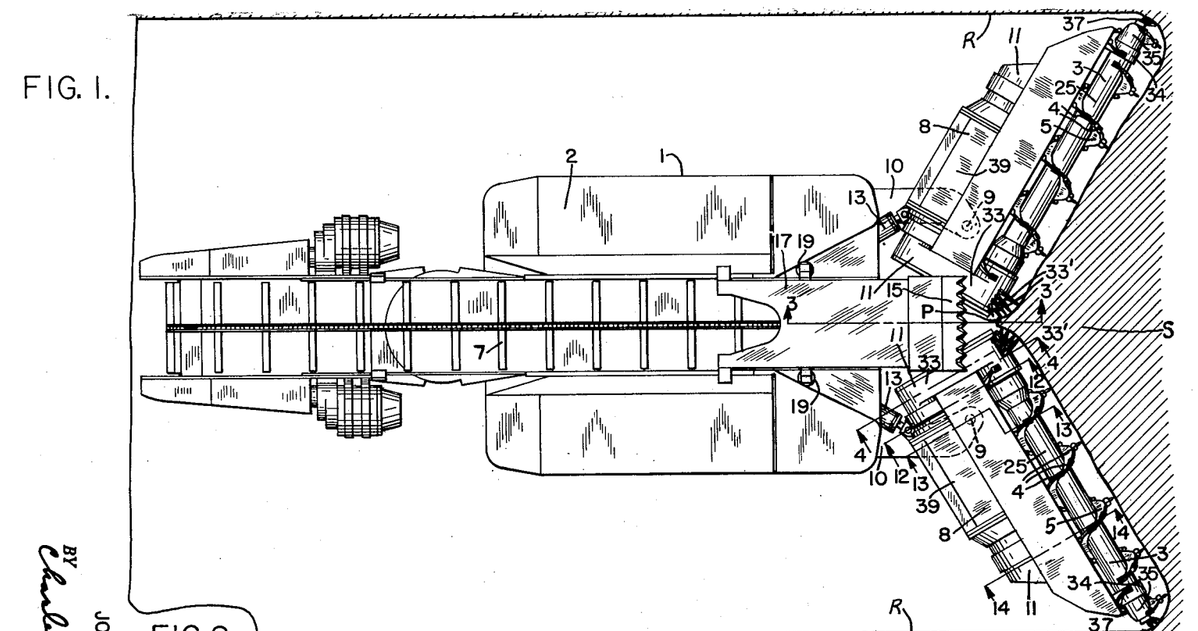
FIG. 1 is a plan view of a continuous mining machine constructed in accordance with a preferred illustrative embodiment of the invention.

The disintegrating and conveying rotors are desirably mounted on horizontally swingable frames 8 pivoted to swing about upright axes, at 9, on forwardly projecting frame portions 10 integral with the base frame near the sides thereof. Vertically swingable arms 11 pivoted to swing about horizontal axes, at 12, on the opposite end portions of horizontal frames 8 have journaled on their outer portions the disintegrating rotors and these swinging arms are continuously oscillatable during rotor-drive by the oscillating mechanism 6, as later described in detail. Extensible power devices 13 desirably in the form of hydraulic jacks serve to swing the rotor frames 8 horizontally about their respective pivots and these power devices are self-locking, as by trapping liquid in the power cylinders, for rigidly holding the rotor frames in adjusted positions. The forwardly and outwardly diverging rotors as the machine is advanced by its crawler base form a V-shaped face, as shown in FIG. 1, and transverse floor and roof cutters 14 and 15 serve to detach the mineral from the floor and roof at the apex or cusp like portion of the V-shaped face. The floor cutter is arranged at the front nose 16 of the conveying means 7 while the roof cutter 15 is mounted on a vertically swingable boom-like frame or arm structure 17 pivoted at 18 on the top of the base frame. Extensible power devices 19 in the form of hydraulic jacks serve to swing the upper cutter frame 17 in vertical planes about its pivot to vary the elevation of the top cutter and to hold the latter in adjusted position.

The disintegrating and conveying rotors or drums are similar in design and therefore a detailed description of one will suffice for both. Each rotor has an elongated cylindric tubular body or tubular cylinder portion 25 to which the spiral conveyor vanes 5 are secured. This tubular body or cylinder portion 25 has end hubs 26 and 27 (FIGS. 5a and 5b) keyed or splined at 28 at axially aligned tubular members or sleeves 29 and 30. The members 29 and 30 are journaled in bearings 31 and 32 respectively supported within an inner gear housing 33 and an outer bearing bracket 34 which provide the swingable arms 11 pivotally mounted on the swingable frame 8. The bearings 32 supported by the outer bearing bracket provide an outboard bearing for the rotor. The rotor is desirably made up of two axially spaced sections, an elongated main section and a relatively short outer section, and the outer section is in the form of a rotary head 35 of outwardly tapered or conical shape and on which a portion of the spiral cutter carrying and conveyor vane 5 is secured. Arranged at the outer end of the rotary head 35 is an annular member 36 carrying cutters 37 likewise in the form of cutter bits.

Figures 8, 9, 10, 11:
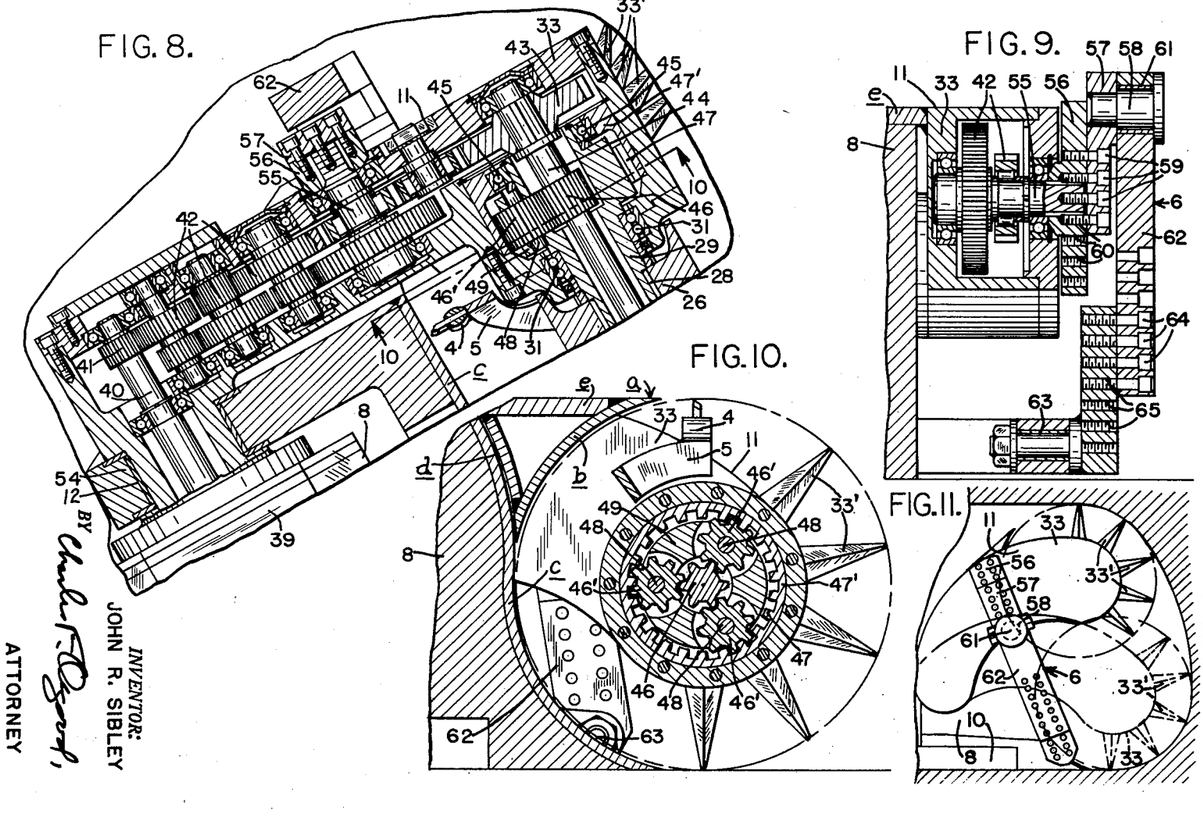
FIG. 8 is a detail section taken along lines 8—8 of FIG. 4.
FIG. 9 is a detail vertical section taken on lines 9—9 of FIG. 4, showing a crank mechanism for automatically oscillating a rotor in vertical planes.
FIG. 10 is a detail vertical section taken on line 10—10 of FIG. 8, showing details of the planetary rotor drive.
FIG. 11 is a somewhat diagrammatic side view of one of the rotors showing different positions of the crank mechanism as indicated in full and dotted lines.

In this improved construction mounted on each of the swingable rotor frames 8 is a motor 39 located at the rear side of the rotor and having its power shaft 40 extending longitudinally in parallelism with the axis of rotor rotation. The drive gearing for the rotors may assume various forms but herein, for illustrative purposes, there is secured to the motor shaft a spur pinion 41 which drives through suitable spur reduction gearings 42, contained in the housing 33, (see also FIG. 8) a spur gear 43 secured to a shaft 44 having a suitable bearing mounting including a bearing 45 carried by the tubular member 29. The shaft 44 is axially aligned with the rotor and has secured thereto a spur pinion 46 meshing with planet gears 46' (FIG. 10) in turn meshing with an internal gear 47 secured to a cylindric member 47' in turn secured to the gear housing 33. The planet gears are journaled on shafts 48 supported by a rotatable planet carrier 49 secured to the tubular member 29. The shaft 44 is attached at 50 to a transmission shaft 51 extending axially within the tubular rotor body 25 and journaled at its outer portion within bearings 52 supported respectively by the tubular member 29 and the outer rotor head 35. The annular cutter carrying member 36 is keyed at 53 to the outer end of the shaft 51. It will thus be seen that the rotor 25 is driven through the planetary reduction gearing at a speed substantially slower than the speed of rotation of the outer cutter carrying member 36.

Figure 12:
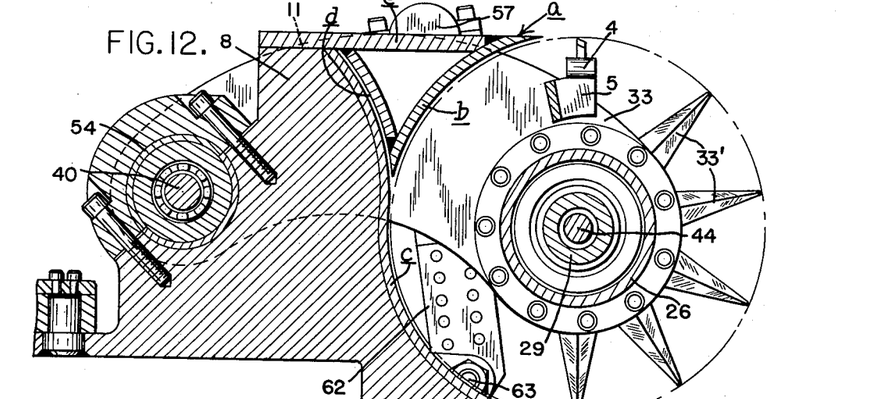
FIGS. 12, 13 and 14 are enlarged vertical sections taken through one of the disintegrating and conveying rotors respectively on lines 12—12, 13—13 and 14—14 of FIG. 1.
Figure 13:
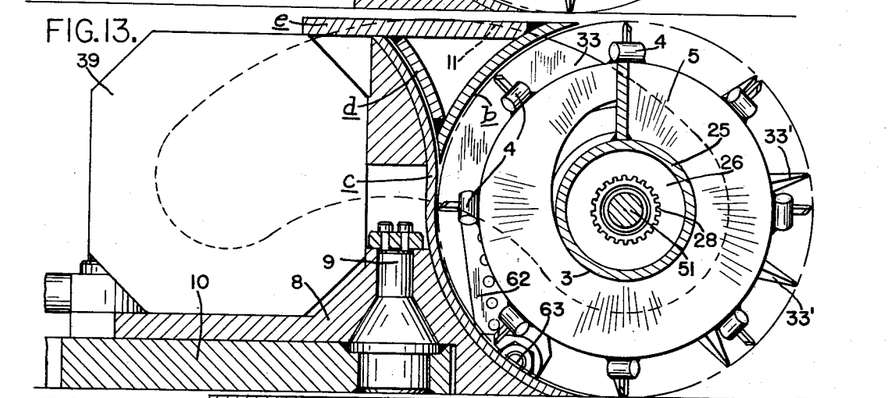
Figure 14:
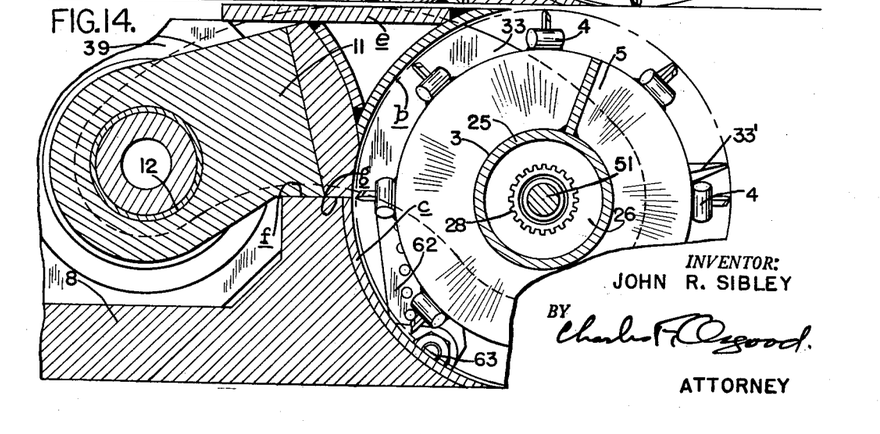

As shown in FIGS. 12, 13 and 14, each pair of vertically swinging rotor arms 11 support a horizontal upper frame providing an outer deflector or shroud *a* extending lengthwise along the top ear surface of the rotor and having a curved surface *b* lying close to the circular rotor-path, as shown in broken lines in these figures. The outer sides of the rotor frames each have an oppositely curved metal plate *c* with which a rearward curved surface *d* on the deflector frame *e* closely cooperates so that an adequate shrouding is provided to prevent rearward movement of the disintegrated mineral from the rotor path in all vertically swung positions of the rotors. The rotor frames 8 have upwardly facing abutment surfaces *f* with which bottom surfaces *g* on the rotor arms 11 may engage to limit the downward movement of the rotors (FIG. 14).

Figure 3:
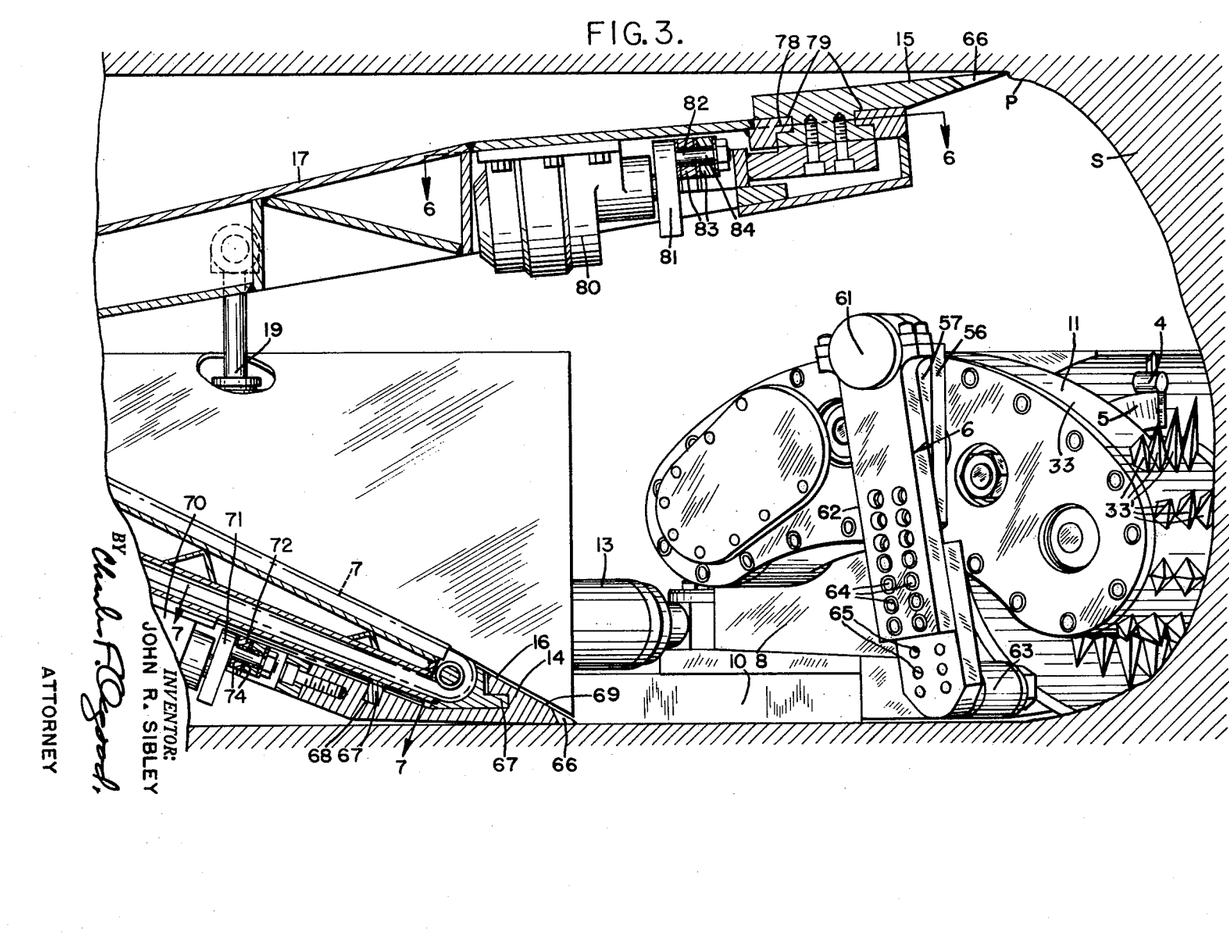
FIG. 3 is an enlarged central longitudinally extending vertical section taken on line 3—3 of FIG. 1.
Figure 4:
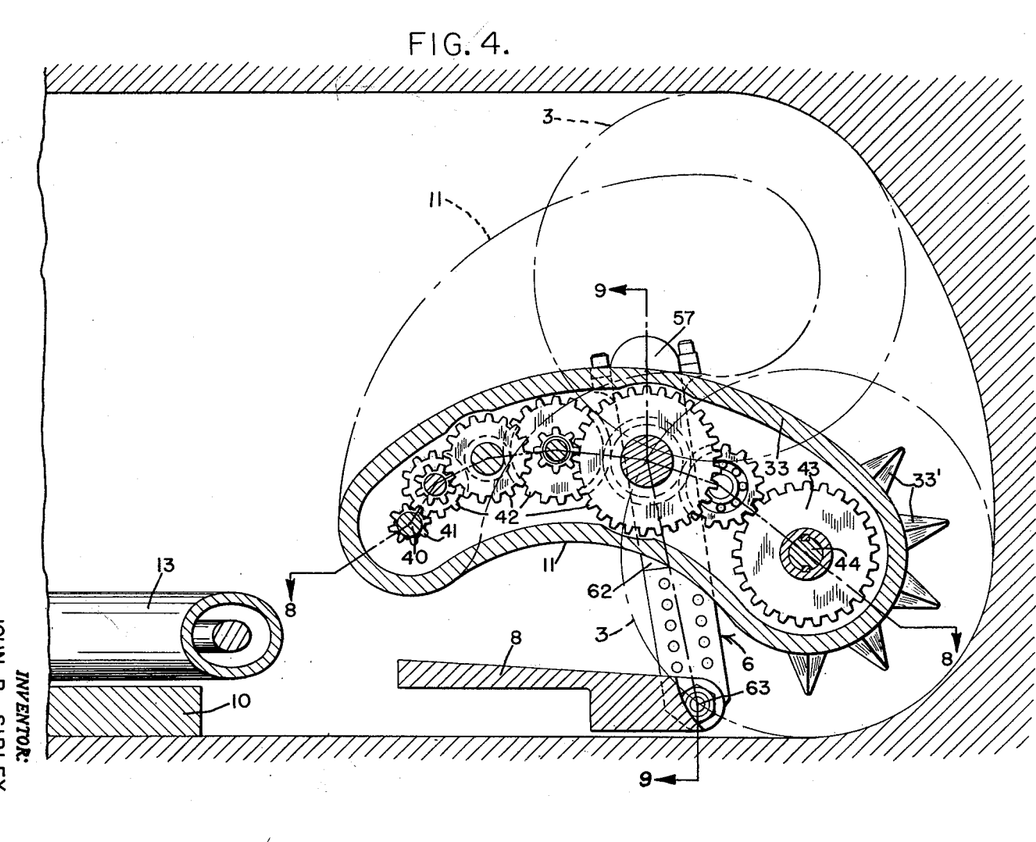
FIG. 4 is an enlarged detail vertical section taken on line 4—4 of FIG. 1, showing details of the drive gearing.
Figures 5A, 6:
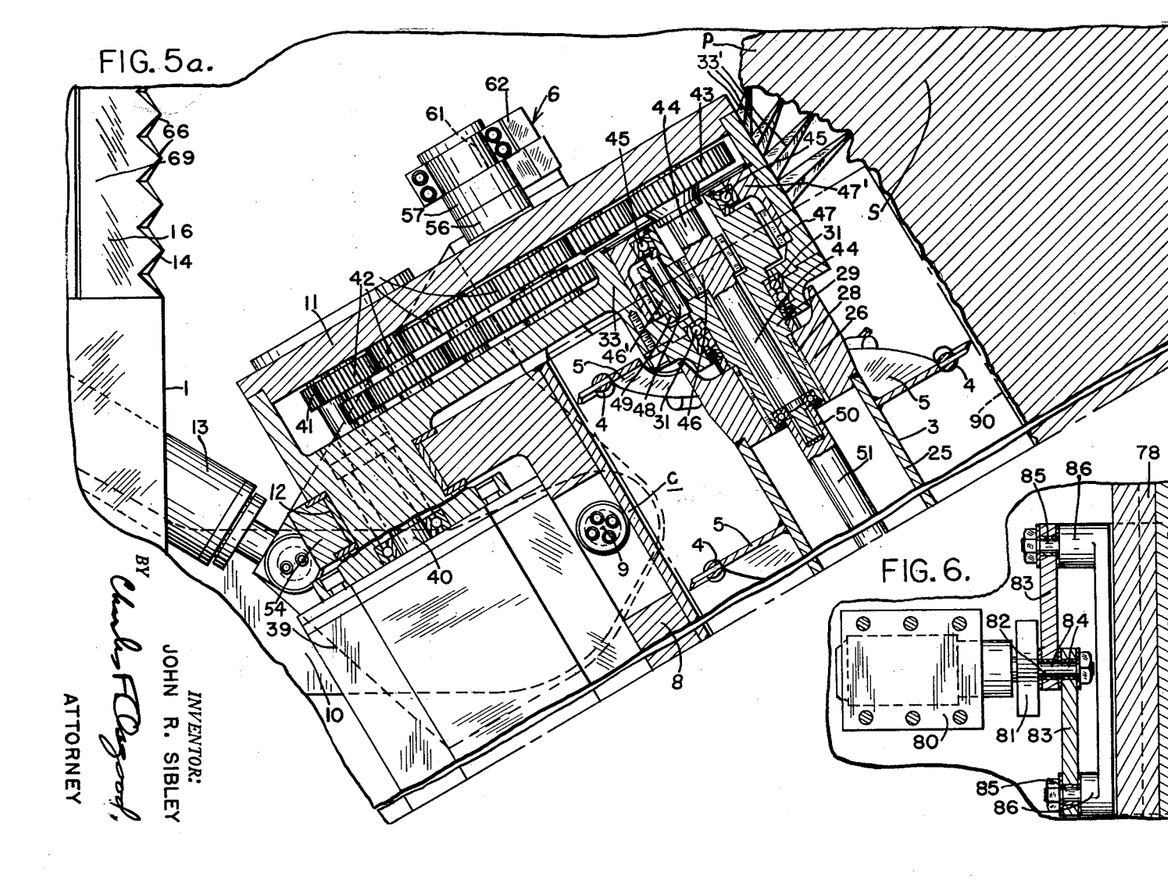
FIGS. 5a and 5b, taken together, consist of an enlarged horizontal section taken through one of the disintegrating rotors on line 5—5 of FIG. 2, with the intermediate portion of the rotor broken away.
FIG. 6 is a detail section taken on line 6—6 of FIG. 3, showing the reciprocating means for the roof cutter.

As mentioned above, each disintegrating and conveying rotor is mounted on swingable arms 11 which desirably have their pivotal axes aligned with the longitudinal axes of the motors 39 so that the rotors may swing in vertical planes relative to their horizontally swingable supporting frames 8. These arms are pivotaly mounted on bearings supported by pivot elements 54 on the rotor frames 8. The means for swinging the arms 11 about their pivots relative to the frame 8 automatically to oscillate each rotor back and forth in vertical planes may assume various forms but herein comprises a shaft 55 driven through certain of the spur gearings 42 (FIGS. 5a and 8) and secured to the shaft 55 (see also FIG. 9) is a radial crank member 56 to which an arm 57 carrying a crank pin 58 is adjustably connected. A series of screws 59 are insertable in certain ones of the threaded openings 60 in the crank member 56 to effect adjustment of the crank pin toward and away from the axis of rotation of the shaft 55. Pivotally connected at one end at 61 to the crank pin is a connecting arm or link 62 and this arm or link is pivotally connected at its opposite end at 63 to the arm 8 provided by the gear housing 33. This connecting arm or link is adjustable by means of screws 64 insertable in certain ones of a series of threaded openings 65 whereby its effective length may be varied. It is accordingly evident that as each rotor is driven by the motor through the spur gearings it is simultaneously oscillated up and down along an arcuate path and by varying the position of the crank pin and the length of the connecting arm the range of vertical swing of the rotor may be varied to accommodate mine veins of different heights. The swinging rotor arms 33 carry a series of projecting teeth 33' (FIGS. 3, 5a and 10) and these teeth, as shown in FIG. 5a, engage the mineral of the working face to break down the latter in the manner shown.

Evidently in lieu of the cranks and links for continuously oscillating the rotors, hydraulic jacks having automatic timing valve means may be employed, such as are disclosed in Patent No. 2,777,681, owned by the assignee of the present invention.

The floor and roof cutters 14 and 15 for illustrative purposes desirably each have a series of penetrating teeth or serrations 66 and are mounted for reciprocatory movement and are driven by motor driven mechanism. The bottom cutter is supported by transverse guides 67 on the conveyor frame engaged in guideways 68 on the reciprocating cutter and the upper surface 69 of the cutter is upwardly and rearwardly inclined and provides the conveyor nose 16 over which the disintegrated mineral may flow toward the conveying means 7 as the machine is advanced toward the work. A motor 70, desirably a conventional hydraulic motor, mounted beneath the conveyor frame drives a crank member 71 carrying a crank pin 72 to which are pivotally connected at their adjacent ends, at 73, oppositely extending crank arms or links 74, the latter in turn being pivotally connected at 75 at their remote ends to lugs 76 secured to the reciprocatory bottom cutter. The upper roof cutter 15 is mounted for reciprocatory movement on transverse guides 78 on the outer portion of the boomlike frame 17 and these guides are engaged in transverse guideways 79 on the cutter frame. A motor 80, likewise a conventional hydraulic motor, mounted beneath the boomlike frame 17 drives a crank member 81 carrying a crank pin 82 to which the adjacent ends of oppositely extending links 83 are pivotally engaged at 84. The remote ends of these links are pivotally connected at 85 to lugs 86 secured to the reciprocatory top cutter. It will thus be seen that the top and bottom cutters are rapidly transversely reciprocated as they are advanced toward the work.

Figures 15, 16, 18:
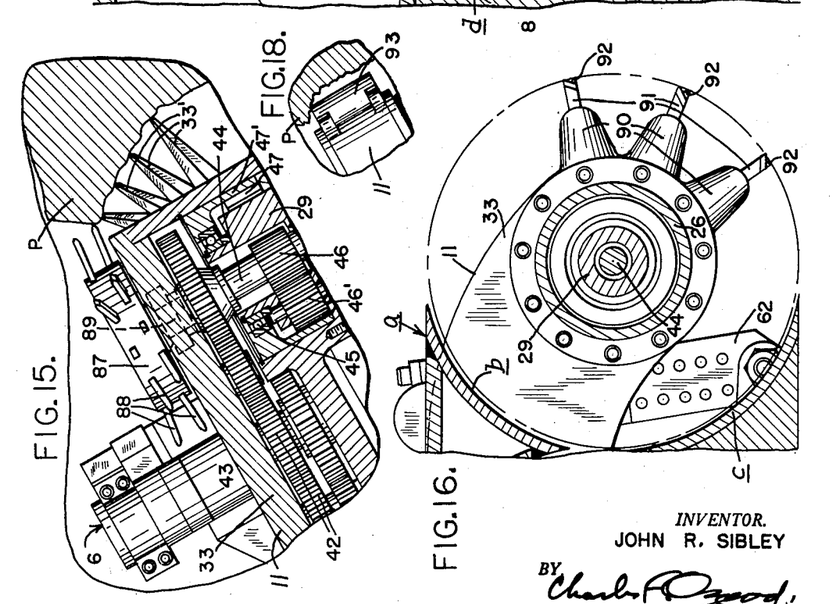
FIG. 15 is a fragmentary sectional view taken in the plane of FIG. 5a, showing a supplemental movable cusp breaker cooperating with the breaker teeth.
FIG. 16 is a detail section taken in the plane of FIG. 12, showing modified detachable breaker teeth.
FIG. 18 is a detail section taken on line 18—18 of FIG. 17, on a slightly reduced scale.

In FIG. 15 a modification is shown wherein supplemental movable breaker means is operatively associated with the rigid breaker teeth 33' on the inner rotor arms 11, for aiding in the removal of the cusp of mineral between the diverging walls of the V-shaped face. This movable breaker means may assume various forms but herein for illustrative purposes comprises a rotary member or narrow wheel 87 carrying peripheral teeth 88 which engage and break away the cusp of mineral as shown and this wheel is driven by an elongation 89 of the drive shaft 44 (FIG. 5a). In FIG. 16 modified breaker teeth are provided in lieu of the integral teeth 33', comprising lugs 90 on the inner rotor supporting arms 11 having suitable sockets for receiving detachable breaker teeth 91 which desirably have oppositely acting cutting points 92 whereby the mineral may be cut and broken away during either direction of vertical swing of the rotors as the latter is advanced toward the work.

Figure 17:
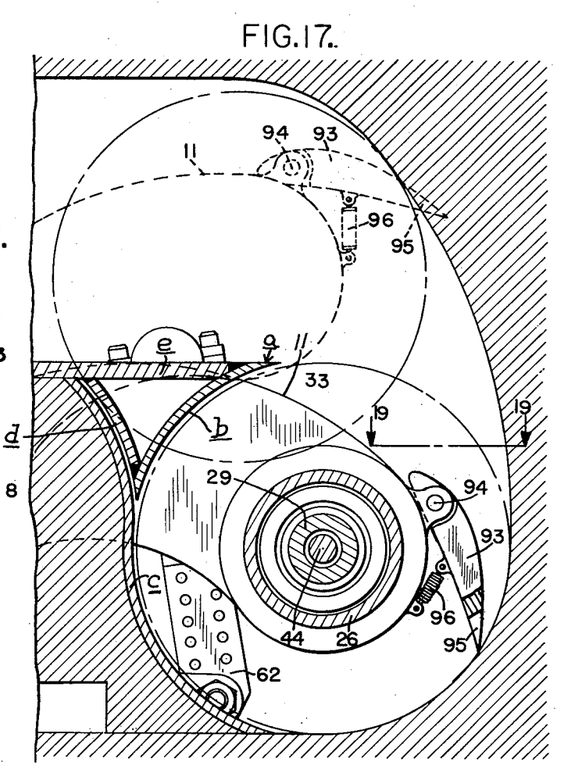
FIG. 17 is a detail vertical section through a disintegrating rotor showing a further modified cusp breaker device.

In FIGS. 17 and 18 a further modified breaker construction is disclosed. Mounted on the inner rotor supporting arms 11 are digging blades 93 pivoted at 94 and having penetrating teeth or serrations 95. A spring 96 serves to force each blade inwardly toward the work supporting arms 11 and is yieldable to permit inward swinging of the toothed penetrating portion of the blade. The heel portion adjacent pivot 94, engages the circular surface of the rotor to limit the outward movement of blades 93 and the extent to which blades 93 are inwardly movable is determined by the unexpanded length of spring 96. Thus as the rotor arms are swung downwardly from the raised dotted line position shown in FIG. 17 the blades swing outwardly to dig into the cusp of mineral to tear fragments thereof from the face.

Figures 5B, 7, 19:
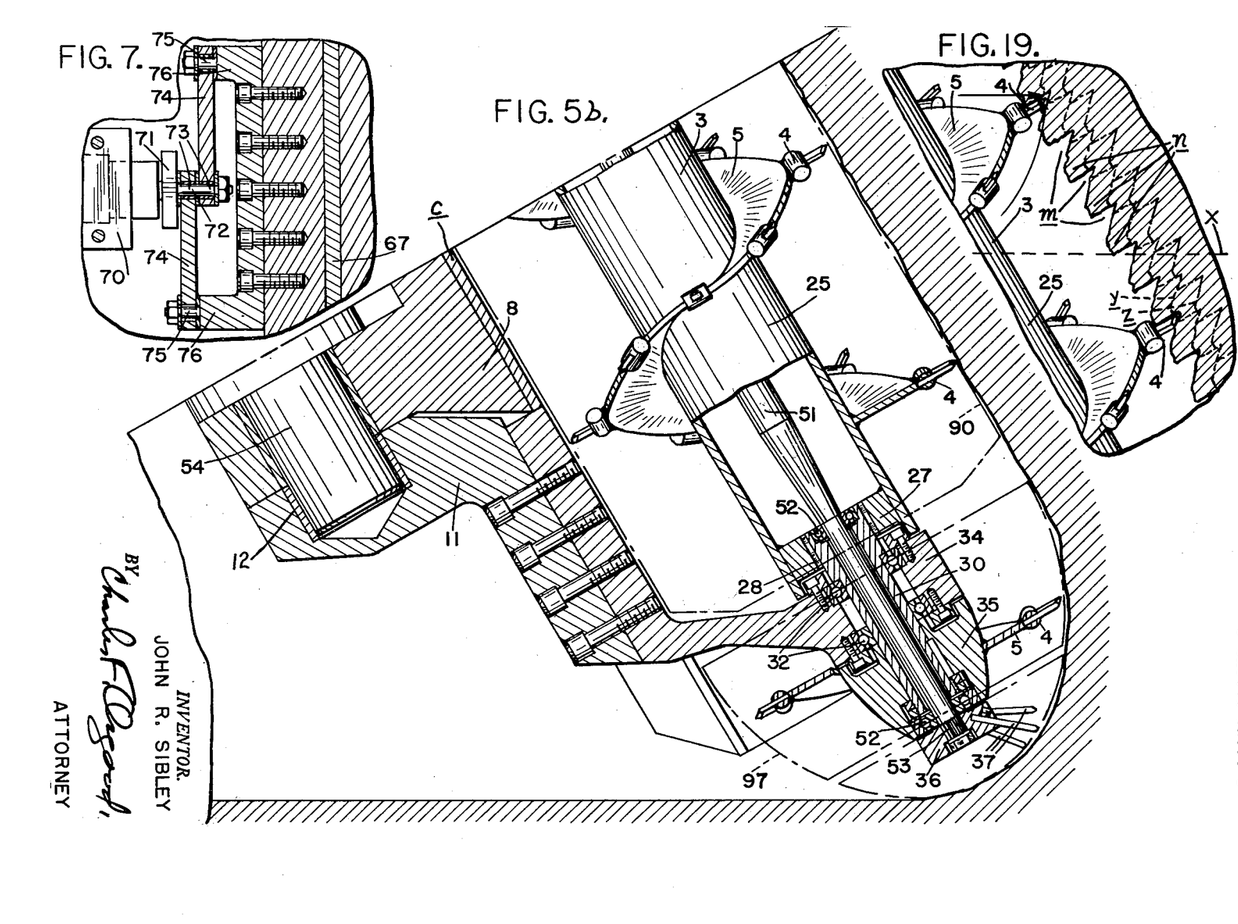
FIG. 7 is a detail section taken on line 7—7 of FIG. 3, showing the reciprocating means for the floor cutter.
FIG. 19 is a fragmentary plan view of one of the rotors showing the manner of cutting the mineral with the spirally ararnged cutter teeth.

The outer rotor heads or end section of the rotors, or end head sections, are each generally parabolic in outline and the generally conical arrangement of the exterior peripheries of the spiral cutter carrying vanes is indicated in outline by broken lines at 97 (FIG. 5b). Due to the angle of the rotors with respect to the rectilinear path of advance of the machine, as viewed in FIGS. 1 and 5b, the cutters encircle the bearing brackets 34 so that when the machine is advanced toward the working face the cutters cut clearance for the bearing brackets so that there is no obstruction.

Each disintegrating rotor, as shown in FIG. 1, is inclined forwardly at a substantial angle with respect to a horizontal line at right angles to the longitudinal median line of the base so that when the machine is advanced toward the work the cutters 4 arranged along the external peripheries of the spiral rotor vanes will move in a generally elliptical path with respect to the work (see also FIG. 5b) and, as shown in FIG. 19, the cutters as they move orbitally cut away the mineral at $m$ to provide projections of mineral at $n$ and upon advance of the rotors along a straight path designated X the vane teeth 4 progressively break away the mineral projections, and as the rotor continually advances the face is progressively broken away as indicated in dotted lines at $y$ and $z$. Thus due to the particular angle of the rotors with respect to the path of travel of the machine the spirally arranged rotor teeth serve to dislodge the mineral with an improved and more efficient cutting action.

Figure 2:
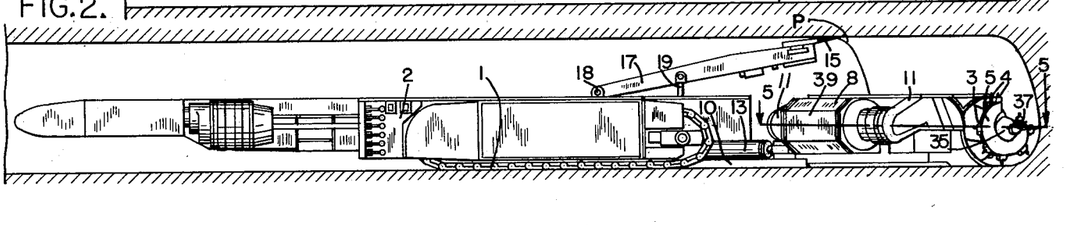
FIG. 2 is a side elevational view of the mining machine shown in FIG. 1.
Figure 20:
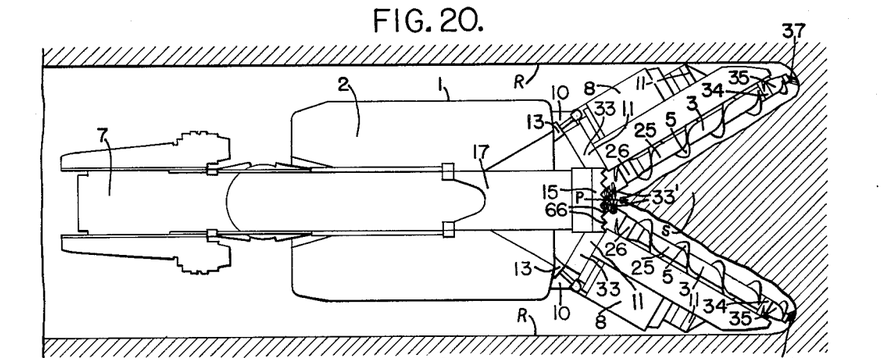
FIG. 20 is a diagrammatic plan view showing the improved mining machine in operating position in a mine.
Figure 21:
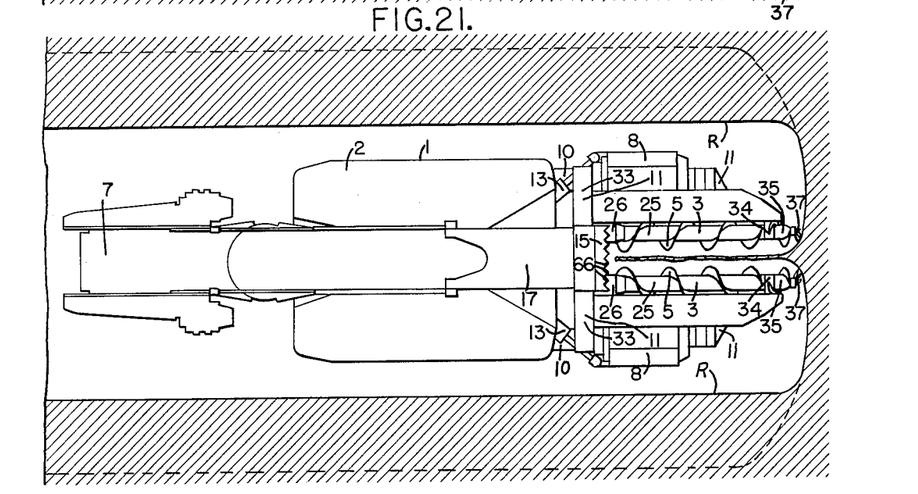
FIG. 21 is a diagrammatic view, similar to FIG. 20, showing the disintegrating and conveying rotors in their closed transport position.
Figure 22:
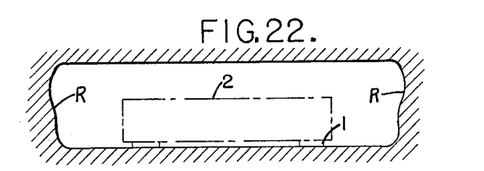
FIGS. 22 and 23 are cross sections respectively showing generally rectangular openings of different width in a mine.
Figure 23:
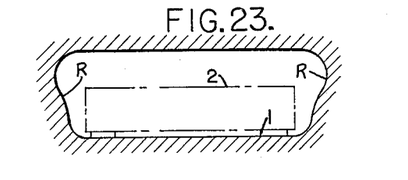

The general mode of operation of the improved continuous mining machine is as follows: The machine may be propelled from place to place by the endless crawler treads of the crawler base and steering of the machine may be effected by controlling the drive of the treads in a well known manner. As is usual in mining machines of the character disclosed the base frame may have vertical tilting movement about a transverse axis relative to the tread frames to raise the rotor frames 8 up above the floor level during travelling of the machine about the mine and usually power jacks may be employed to effect such tilting movement as is well-known in the art. During travelling the rotor frames 8 may be swung inwardly relatively close together, as shown in FIG. 21, and when the working face is reached the tilting base frame may be lowered close to the mine floor as shown in FIG. 2 and the rotor frames 8 may be swung apart by the hydraulic jacks 13 to the position shown in FIG. 1, and thereafter liquid may be trapped in the jack cylinders to lock the rotor frames in adjusted position. When a narrow working face is being mined out the rotors may be positioned as shown in FIG. 20. The drive cranks 58 and connecting links 57 and 62 may be adjusted so that the height of swing of the rotors may be set for a particular height of mine vein. The rotors may then be fed rectilinearly forwardly toward the face by the crawler treads to feed the same into the mineral of the mine vein and the mineral dislodged and disintegrated by the cutters of the rotors may be fed inwardly and rearwardly by the spiral conveyor vanes toward the forward receiving end of the conveying means 7. The conveying means 7 conveys the material received thereby rearwardly longitudinally of the machine. As the machine is advanced along a straight path toward the work by the crawler base the mineral is cut by the rotor teeth throughout the full height of the vein between the floor and roof by the continuous oscillatory motion of the rotors. The disintegrating and conveying rotors due to their novel arrangement develop the ribs R of the room or mine passageway a substantial distance in advance of the center or apex (or cusplike) portion P of the face leaving a substantial central roof support well inwardly toward the machine and this central roof support due to the angularly related positions of the rotors is substantially V-shaped in horizontal section as shown at S in FIGS. 1 and 20, and the roof support thus provided is substantially continuous as the machine moves forwardly during its operation. When it is desired to withdraw the rotors from the working face of the mine vein the machine may be retracted by the crawler base from the face and the rotors may be swung inwardly toward one another as shown in FIG. 21, and the rotors may be maintained in such inward positions during maneuvering of the machine and travelling of the machine about the mine. When the rotors are swung inwardly toward one another as shown in FIG. 21 the outer lateral limits of the rotors lie substantially within the projections of the sides of the base thereby not only to facilitate maneuvering of the machine but also to provide adequate space between the sides of the machine and the ribs for the setting of roof props or other roof supports.

In the event the crawler treads of the crawler base become inadequate to feed the rotors into the mine vein supplemental feeding means may be provided, as for example, feed drums on the machine engaging feed cables anchored to the face, in a well known manner.

As a result of this invention an improved mining machine is provided having improved cutting and dislodging devices whereby the mineral of a solid mine vein may be dislodged and disintegrated in an improved manner. By the provision of the disintegrating and conveying rotors for completely disintegrating the mineral between the floor and roof and throughout a substantial width across the face the mineral may be cut and dislodged in a more efficient manner. The automatic swing mechanism for the rotors for continuously oscillaitng the latter in vertical planes enables complete removal of the mineral between the floor and roof and by the provision of the adjustable means for effecting rotor swing mine veins of different heights may be cut and dislodged. Due to the novel arrangement of the disintegrating and conveying rotors the mineral is not only mined out in an improved manner but also quickly and efficiently. The machine is relatively rugged and compact in design and flexible in operation, well adapted to meet the conditions encountered in low vein mining work. Other advantages of the invention will be clearly apparent to those skilled in the art.

While there are in this application specifically described one form and several modifications which the invention may assume in practice, it will be understood that this form and modifications of the same are shown for purposes of illustration and that the invention may be further modified and embodied in various other forms without departing from its spirit or the scope of the appended claims.

What I claim as new and desire to secure by Letters Patent is:

1. A mining apparatus comprising a mobile base, spaced pivot means on said base being located on opposite sides respectively of the longitudinal median of said base, elongated support means connected to said pivot means respectively for pivotal movement toward and away from each other, disintegrating head support means being pivotally connected to said elongated support means for pivotal movement relative thereto about axes which are normal to the pivot axes of said pivot means respectively, disintegrating heads rotatably mounted on said disintegrating head support means respectively, and power means for reciprocating said disintegrating head support means about said last mentioned axes and for rotating said disintegrating heads respectively.

2. A mining apparatus as set forth in claim 1 wherein said disintegrating heads comprise a rotary spiral conveyor carrying cutters at the peripheries of the spiral conveyor vanes respectively.

3. A mining machine as set forth in claim 1 wherein said disintegrating heads comprise alined horizontal rotor sections, and bearing brackets for supporting said rotor sections.

4. A mining machine as set forth in claim 3 wherein one bearing bracket extends between the adjacent ends of said alined horizontal rotor sections.

5. A mining machine as set forth in claim 3 wherein the outer section of said disintegrating heads is generally conical in outline and is recessed at its inner portion with the adjacent bearing bracket extending into the recess.

6. In a mining apparatus as set forth in claim 1 wherein said means for rotating each of said disintegrating heads comprises a motor carried by said disintegrating head support means and drive gearing driven by said motor and operatively connected to said disintegrating heads.

7. A mining apparatus as set forth in claim 1 wherein means are provided for adjusting the reciprocating distance of said disintegrating heads.

8. In a mining machine, a base movable over the floor of a mine, cutting and disintegrating mechanism carried by said base comprising a pair of relatively inclined disintegrating and conveying rotors diverging forwardly and outwardly from said base, means for rotating said rotors in unison, means for advancing said rotors with respect to the face of a mine vein, said rotors as they are advanced forming a face substantially V-shaped in plan, and floor and roof cutters for detaching the apex portion of the V-shaped face from the roof and floor as said rotors are advanced.

9. A mining machine as set forth in claim 8 wherein means is provided for adjusting the elevation of said rotors and of said roof cutter to vary the operating height of the machine.

10. In combination, a supporting frame movable along a rectilinear path toward the face of a mine vein, a rotor journaled on said frame to revolve about a horizontal axis inclined forwardly at a substantial angle with respect to a line disposed at right angles to said rectilinear path, said rotor having a spiral vane along the length thereof carrying disintegrating teeth along its outer edge, and a mechanism for oscillating said frame for moving said teeth on said rotor along a generally elliptical path into engagement with the mineral of the face to cause dislodgment of the mineral as said frame is moved in such rectilinear path.

11. A mining apparatus comprising a mobile base, spaced pivot means on said base and being located on opposite sides respectively of the longitudinal median of said base, elongated support means connected to said pivot means respectively for pivotal movement toward and away from each other, disintegrating head support means being pivotally connected to said elongated support means for pivotal movement relative thereto about axes which are normal to the pivot axes of said pivot means respectively, disintegrating heads rotatably mounted on said disintegrating head support means respectively, power means for reciprocating said disintegrating head support means about said last mentioned axes and for rotating said disintegrating heads respectively, and means connected to said disintegrating head support and to said elongated support means respectively for varying the limits of reciprocation of said disintegrating head support means respectively.

12. A mining apparatus comprising, a mobile base, spaced pivot means on said base located on opposite sides of the longitudinal median of said base, respectively, elongated support means connected to said pivot means respectively for pivotal movement toward and away from such longitudinal median, selectively operable power means connected to said base and to said elongated support means for moving said elongated support means about said pivot means and being operable to maintain said elongated support means in a forwardly diverging position during forward movement of said base, disintegrating head support means being pivotally connected to said elongated support means for pivotal movement relative thereto about axes which are normal to the pivot axes of said pivot means respectively, disintegrating means rotatably mounted on said disintegrating head support means and extending substantially coextensive therewith, and power means secured to said disintegrating head support means for rotating said disintegrating means and for oscillating said disintegrating head support means about such axes respectively.

13. A mining apparatus comprising, a mobile base, spaced pivot means on said base located on opposite sides of the longitudinal median of said base respectively, elongated support means connected to said pivot means respectively for pivotal movement toward and away from such longitudinal median, selectively operable power means connected to said base and to said elongated support means for moving said elongated support means about said pivot means and being operable to maintain said elongated support means in a forwardly diverging position during forward movement of said base, disintegrating head support means being pivotally connected to said elongated support means for pivotal movement relative thereto about axes which are normal to the pivot axes of said pivot means respectively, disintegrating means rotatably mounted on said disintegrating head support means and extending substantially coextensive therewith, power means secured to said disintegrating head support means for rotating said disintegrating means and for oscillating said disintegrating head support means about such axes respectively, and means actuated by said power means being connected to said disintegrating head support and to said elongated support means respectively for changing the angle subtended by the path through which said disintegrating head support means describes respectively.

14. In combination, a disintegrating rotor, supporting and driving means therefor, and a movable breaker device driven simultaneously with said rotor relative thereto for engaging and breaking away mineral at one end of said rotor wherein a rotary toothed head is arranged at the opposite end of said rotor from said breaker device and is movable relative to said rotor and to said breaker device as said rotor is driven.

15. A mining apparatus comprising, a mobile base, spaced pivot means on said base, said pivot means being located on opposite sides respectively of the longitudinal medium of said base, elongated support means connected to said pivot means respectively for pivotal movement toward and away from each other, other pivot means on said elongated supports respectively, disintegrating head support means pivotally connected to said other pivot means respectively for pivotal movement relative to said elongated support with the axes of said other pivot means disposed normal to the pivot axes of said spaced pivot means respectively, said other pivot means having the axes thereof extending in the same general direction as said elongated support and said disintegrating head support.

References Cited in the file of this patent

UNITED STATES PATENTS

| | | |
|---|---|---|
| 1,143,897 | Flexner et al. | June 22, 1915 |
| 1,336,440 | O'Toole | Apr. 13, 1920 |
| 1,534,462 | O'Toole | Apr. 21, 1925 |
| 2,261,160 | Joy | Nov. 4, 1941 |
| 2,634,963 | Barrett | Apr. 14, 1953 |
| 2,694,562 | Snyder et al. | Nov. 16, 1954 |
| 2,758,826 | Paget | Aug. 14, 1956 |
| 2,776,824 | Osterhus et al. | Jan. 8, 1957 |
| 2,836,408 | Barrett | May 27, 1958 |
| 2,967,701 | Wilcox | Jan. 10, 1961 |

FOREIGN PATENTS

| | | |
|---|---|---|
| 316,292 | Germany | Nov. 24, 1919 |